(12) United States Patent
Cain et al.

(10) Patent No.: US 10,169,137 B2
(45) Date of Patent: Jan. 1, 2019

(54) DYNAMICALLY DETECTING AND INTERRUPTING EXCESSIVE EXECUTION TIME

(71) Applicant: International Business Machines Corporation, Armonk, NY (US)

(72) Inventors: Christopher J. Cain, Pine Island, MN (US); Reed B. Frandsen, Oronoco, MN (US); Lee N. Helgeson, Rochester, MN (US); James A. O'Connor, Ulster Park, NY (US)

(73) Assignee: International Business Machines Corporation, Armonk, NY (US)

( * ) Notice: Subject to any disclaimer, the term of this patent is extended or adjusted under 35 U.S.C. 154(b) by 195 days.

(21) Appl. No.: 14/945,121

(22) Filed: Nov. 18, 2015

(65) Prior Publication Data

US 2017/0139767 A1    May 18, 2017

(51) Int. Cl.
*G06F 11/00* (2006.01)
*G06F 11/07* (2006.01)

(52) U.S. Cl.
CPC ........ *G06F 11/0793* (2013.01); *G06F 11/079* (2013.01); *G06F 11/0721* (2013.01); *G06F 11/0751* (2013.01)

(58) Field of Classification Search
CPC ............. G06F 11/0721; G06F 11/0757; G06F 11/0793
See application file for complete search history.

(56) References Cited

U.S. PATENT DOCUMENTS

| | | |
|---|---|---|
| 5,442,763 A | 8/1995 | Bartfai et al. |
| 5,664,088 A | 9/1997 | Romanovsky et al. |
| 5,872,981 A | 2/1999 | Waddington et al. |
| 5,922,078 A | 7/1999 | Hirayama et al. |
| 6,539,339 B1 * | 3/2003 | Berry ............. G06F 11/3466 702/182 |
| 6,553,512 B1 | 4/2003 | Gibson |
| 7,496,918 B1 | 2/2009 | Dice et al. |
| 7,526,682 B1 | 4/2009 | Chacko et al. |
| 7,958,402 B2 | 6/2011 | Lee et al. |

(Continued)

FOREIGN PATENT DOCUMENTS

WO    2002093374 A2    11/2002

OTHER PUBLICATIONS

Bovenzi, Antonio, et al., "OS-level Hang Detection in Complex Software Systems," International Journal of Critical Computer-Based Systems 2, No. 3, 2011, pp. 352-377.

(Continued)

*Primary Examiner* — Elmira Mehrmanesh
(74) *Attorney, Agent, or Firm* — Patterson + Sheridan, LLP

(57) ABSTRACT

Systems, methods, and computer program products to perform an operation comprising storing, by a kernel and in a queue, an indication that a first process has called a second process, collecting process data for at least one of the first process and the second process, determining, by the kernel, that an amount of time that has elapsed since the first process called the second process exceeds a time threshold, storing the queue and the process data as part of a failure data capture, and performing a predefined operation on at least one of the first process and the second process.

20 Claims, 6 Drawing Sheets

(56) References Cited

U.S. PATENT DOCUMENTS

| | | | | |
|---|---|---|---|---|
| 7,996,732 B2* | 8/2011 | Nishimura | ............ | G06F 9/4812 |
| | | | | 714/25 |
| 8,024,739 B2* | 9/2011 | Lewis | ..................... | G06F 9/485 |
| | | | | 718/104 |
| 8,191,071 B2* | 5/2012 | Noll | ..................... | G06F 9/4881 |
| | | | | 707/661 |
| 8,209,683 B2 | 6/2012 | Austen et al. | | |
| 8,245,207 B1* | 8/2012 | English | .................. | G06F 8/456 |
| | | | | 712/203 |
| 8,402,318 B2* | 3/2013 | Nieh | .................. | G06F 11/3419 |
| | | | | 714/15 |
| 8,434,082 B2 | 4/2013 | Bliss | | |
| 8,776,093 B2* | 7/2014 | Lupu | ..................... | G06F 11/366 |
| | | | | 714/38.11 |
| 9,092,332 B2* | 7/2015 | Taylor | ................. | G06F 11/0787 |
| 2009/0320021 A1 | 12/2009 | Pan et al. | | |

OTHER PUBLICATIONS

Zhu, Yian, et al., "What is System Hang and How to Handle It," 2012 IEEE 23rd International Symposium on Software Reliability Engineering (ISSRE), pp. 141-150, IEEE, 2012.

Kumar, R., "Recovery in Multithreaded Applications Using Execution Monitoring and Recovery Engine (EMRE)," 2010 International Conference on Computer Information Systems and Industrial Management Applications (CISIM), pp. 353-358, IEEE, 2010.

Stack Exchange Inc., Super User.com, "Can systemd detect and kill hung processes?", retrieved Nov. 17, 2015, <http://superuser.com/questions/689017/can-systemd-detect-and-kill-hung-processes>.

* cited by examiner

| PID 1 | PID 2 | PID 3 | TIME |
|---|---|---|---|
| foo1()->foo2()->soo1() | | | T0 |
| | soo1()->soo2()->()soo3()->goo1() | | T1 |
| | | goo1()->Foo8() | T2 |
| foo8() | | | |

201

| Queue | Time |
|---|---|
| PID1 foo2() -> PID2 soo1() | T0 |
| PID2 foo3() -> PID3 goo1() | T1 |
| PID3 foo3() -> PID1 foo8() | T2 (if T2 Timer > Threshold value) |

DYNAMICALLY DETECTING AND INTERRUPTING EXCESSIVE EXECUTION TIME

BACKGROUND

The present disclosure relates to computer software, and more specifically, to dynamically detecting and interrupting excessive execution times.

Debugging and isolating faults in complex software and firmware can present a variety of challenges. For example, software hangs often result in no failure signature being captured. Often, a server reboot may be required to recover from the hang. However, doing so normally destroys all traces of the failure, leaving service personnel and code developers with little diagnostic information from which to find the root cause and fix the problems. Hangs can often be hard to reproduce, requiring a particular sequence of events to be executed or a particular load be applied to the system, making such problems even more challenging to resolve. Sometimes, it is difficult to even detect a hang, as systems often appear to be operational, but in reality are nonfunctional.

SUMMARY

According to one embodiment disclosed herein, a method comprises storing, by a kernel and in a queue, an indication that a first process has called a second process, collecting process data for at least one of the first process and the second process, determining, by the kernel, that an amount of time that has elapsed since the first process called the second process exceeds a time threshold, storing the queue and the process data as part of a failure data capture, and performing a predefined operation on at least one of the first process and the second process.

According to another embodiment, a system comprises a processor and a memory containing instructions which when executed by the processor, performs an operation comprising storing, by a kernel and in a queue, an indication that a first process has called a second process, collecting process data for at least one of the first process and the second process, determining, by the kernel, that an amount of time that has elapsed since the first process called the second process exceeds a time threshold, storing the queue and the process data as part of a failure data capture, and performing a predefined operation on at least one of the first process and the second process.

According to another embodiment, a computer readable storage medium stores instructions which when executed by a processor, performs an operation comprising storing, by a kernel and in a queue, an indication that a first process has called a second process, collecting process data for at least one of the first process and the second process, determining, by the kernel, that an amount of time that has elapsed since the first process called the second process exceeds a time threshold, storing the queue and the process data as part of a failure data capture, and performing a predefined operation on at least one of the first process and the second process.

BRIEF DESCRIPTION OF THE SEVERAL VIEWS OF THE DRAWINGS

FIG. 2 illustrates a process sequence and a queue, according to one embodiment.

DETAILED DESCRIPTION

Embodiments disclosed herein detect excessive run-time of specific software components by using inter-process function calls as a trigger point for timing processes. When a timing threshold is reached, an interrupt to terminate or recover the process may be generated. Generally, each process may be associated with a time threshold. When a process calls another process, the call is placed on a queue. When the time threshold for the call is reached, the calling process may be terminated and the queue and monitoring data collected to improve fault isolation. Embodiments disclosed herein allow users to select, for each process, whether to interrupt or terminate or recover the process when the threshold is reached. By implementing the timing and detection in the system kernel, all processes can access the functionality disclosed herein, rather than having every component that needs this functionality duplicate the code.

Figure 1A:
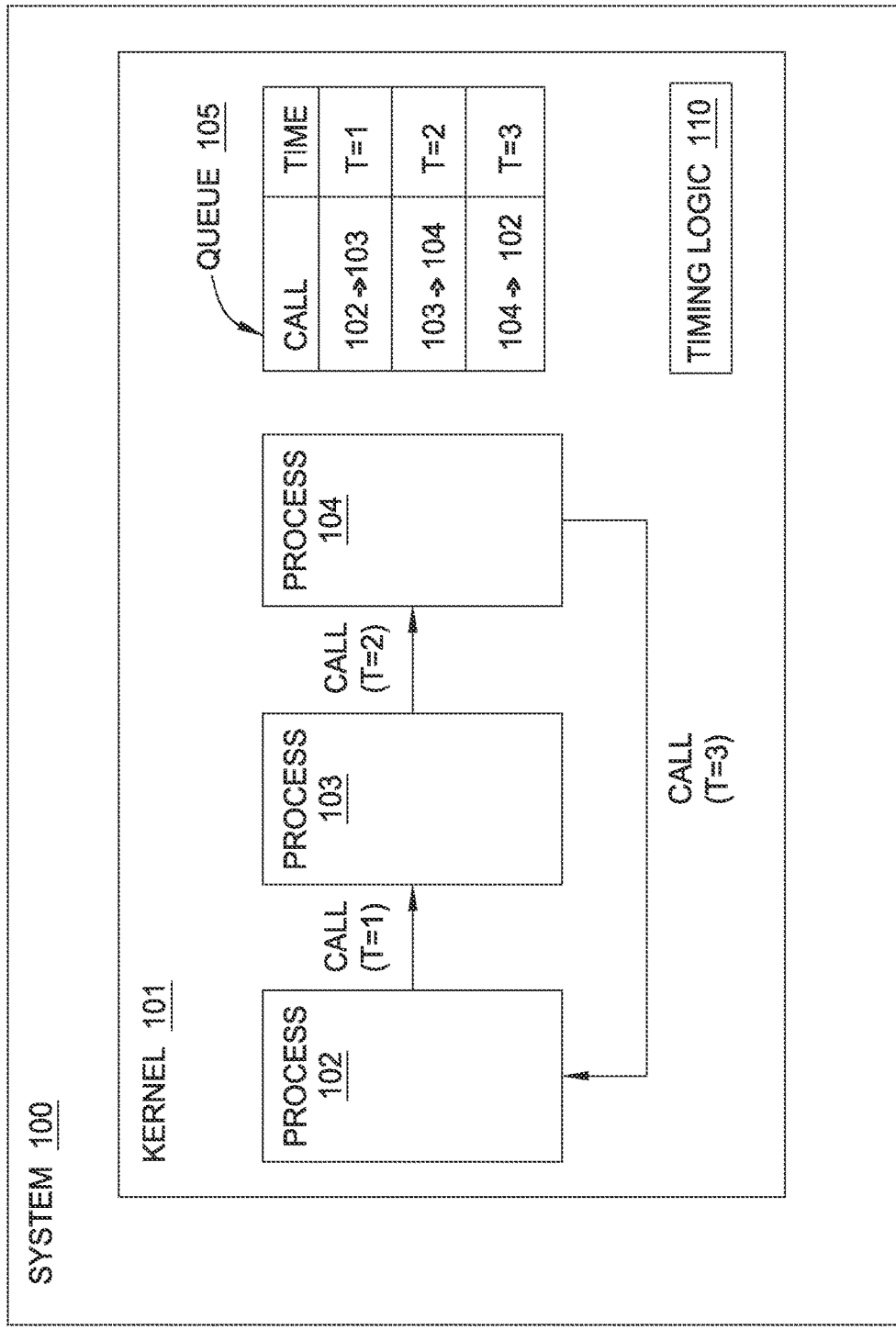
FIGS. 1A-1B illustrate a logical view of a system configured to dynamically detect and interrupt excessive execution times, according to various embodiments.

FIG. 1A illustrates a logical view of a system 100 configured to dynamically detect and interrupt excessive execution times, according to one embodiment. The system 100 illustratively executes an operating system kernel 101 and three processes 102-104. The kernel 101 is configured to detect excessive execution times by processes executing on the system 100. When a process makes a call to an external process (an inter-process call), the kernel 101 may invoke the timing logic 110 to set a timer for the inter-process call. In addition, the kernel 101 may store an indication of the inter-process call in a queue 105. The queue 105 may also be referred to as a stack. The kernel 101 may also collect "process data" for the processes in the inter-process call. The process data may include, without limitation, contents of each process' stack, process memory usage, process CPU usage, system memory usage, system CPU usage, and the like. The process data may be stored in the queue 105, or in a separate data structure. If the timer for an inter-process call expires (such as in the case of a deadlock), the kernel 101 may interrupt the process and output the contents of the queue 105 and the process data as part of an data dump that can be used to identify the issues that led to the inter-process call not completing.

As shown, the process 102 makes a call to the process 103 at time T=1. The call may between functions (not pictured) within each process. When the process 102 calls process 103, the kernel 101 may invoke the timing logic to start a timer for the call. In addition, as shown, the kernel 101 stores an indication of the call from process 102 to process 103 at time T=1 in the queue 105. Many modern operating systems can detect inter-process calls. However, in operating systems that do not detect such calls, the kernel 101 may be configured to identify inter-process calls by determining that one process is accessing memory outside of its own address space. Generally, processes executing on the system 100 are identified by a unique process identifier (PID). Therefore, in at least one embodiment, the queue 105 includes the PIDs subject to each inter-process call. As previously described, the kernel 101 may also store process data for the inter-process call between process 102 to process 103.

As shown in FIG. 1A, process 103 calls process 104 at time T=2, and process 104 calls process 102 at time T=3. Therefore, as shown, the kernel 101 has added indications of the calls to the queue 105. In addition, at time T=2, the kernel 101 invokes the timing logic 110 to set a timer for the inter-process call from process 103 to process 104. At time T=2, the kernel 101 may also store process data for the inter-process call from process 103 to process 104. Similarly, at time T=3, the kernel 101 invokes the timing logic 110 to set a timer for the inter-process call from process 104 to process 102. At time T=3, the kernel 101 may also store process data for the inter-process call from process 104 to process 102.

The timing logic 110 may be implemented as a wrapper where a timer is started, and if a time threshold (which may be specific to a given process) is exceeded, the kernel 101 generates an interrupt. For example, if the time threshold for process 103 to complete is 1 minute, and one minute elapses from time T=2, the timing logic 110 and/or the kernel 101 may generate an interrupt. The interrupt may perform a predefined operation, such as terminating the process or restarting a process. In addition, the kernel 101 preserves the queue 105 and additional data for diagnostics. By preserving the queue 105, users are able to view which inter-process calls were made, at what times, and in the precise order, providing valuable insight to developers attempting to resolve any issues. The kernel 101 may also collect and preserve additional data attributes for each function or process being monitored in the queue 105. For example, the kernel 101 may store threshold times (minimum or maximums), recovery actions associated with a function (such as terminating, restarting, etc., after a hang), an impact priority of the function, and average execution time for the function. More generally, the kernel 101 may also trigger a first failure data capture (FFDC), which instantly collects information about events and conditions that might lead to an error, failure, deadlock, hang, and the like. By implementing the timing logic 110 to time inter-process calls, the kernel 101 is able to detect hangs and deadlocks much more quickly.

Figure 1B:
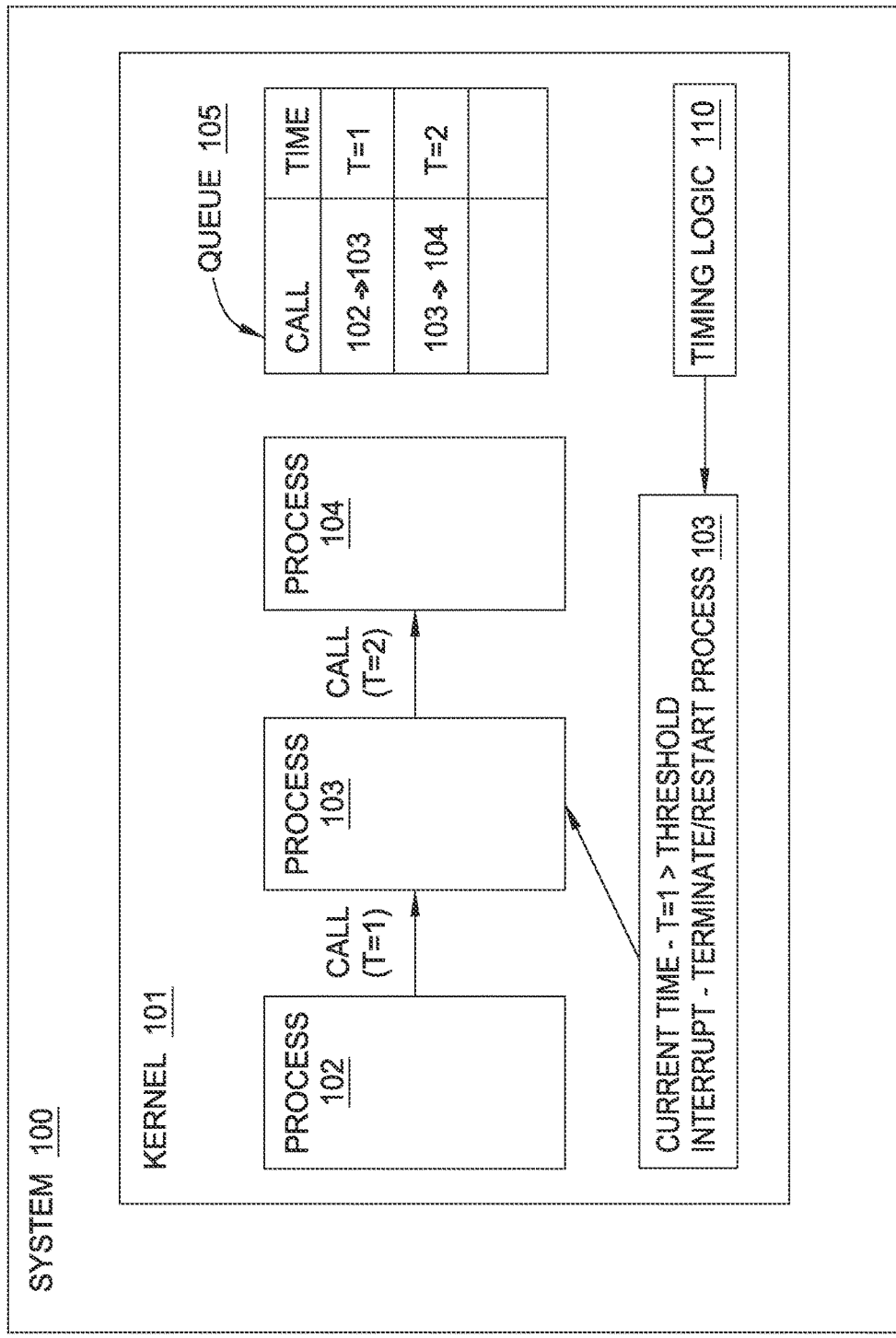

When an inter-process call completes, the kernel 101 removes the call from the queue 105. For example, the call from process 104 to process 102 may complete. FIG. 1B depicts the queue 105 after the completion of the call from process 104 to process 102. As shown, the queue 105 no longer includes the entry for the call from process 104 to process 102. However, as shown, the timing logic 110 has determined that the timer for the call from process 102 to process 103 has expired. Stated differently, the current time minus time T=1 is greater than a threshold amount of time for a call to process 103. Therefore, as shown, once the timer expires, an interrupt is generated. The interrupt may terminate and/or restart the subject process, which should resolve the deadlock or hang. Illustratively, the interrupt in FIG. 1B targets process 103. However, the interrupt may target process 102 and/or process 103. In at least one embodiment, the kernel 101 may terminate the longest running process (based on the timers for each respective process). In addition, the kernel 101 may terminate processes based on priorities for each process. For example, if process 102 has a higher relative priority than process 103, the kernel may initially terminate process 103.

In at least one embodiment, the thresholds for each process may be defined by executing a plurality of calls to each process (or function therein), and collecting metrics for each process. The plurality of calls may be made by a test application or other testing environment. For example, the timing threshold may be based on the minimum, average, and/or maximum times for each call to complete. In some embodiments, the maximum time for a call to complete must be greater than a minimum interrupt threshold before defining a threshold for the call. Doing may save system resources by not monitoring calls to processes that typically complete quickly.

FIG. 2 illustrates a table 201 describing a process sequence and a corresponding queue 105, according to one embodiment. As shown, three processes in the table 201 execute function calls. For example, the process having a process ID of PID1 executes three function calls. More specifically, PID1 has a function foo1( ) which calls function foo2( ). Function foo2( ) then makes an inter-process function call to function soo1( ) of process PID2 at time T0. Upon detecting the inter-process function call, the kernel 101 adds an indication of the call from foo2( )->soo1( ) at time T0 in the queue 105. In process PID2, function soo1( ) calls function soo2( ) and function soo2( ) calls function soo3( ). At time T1, function soo3( ) makes an inter-process function call to function goo1( ) of process PID3. Accordingly, the kernel 101 inserts an indication of the call from soo3( ) to goo1( ) at time T1 in the queue 105. As shown, function goo1( ) calls function foo8( ) in process PID 3 at time T2. In response, as shown, the kernel 101 inserts an indication of the call from goo1( ) to foo8( ) at T2 in the queue 105. As previously indicated, the kernel 101 collects and stores process data for each inter-process call.

Furthermore, FIG. 2 illustrates a deadlock scenario where the timer for function T2 is greater than a threshold time value for function foo8( ). Responsive to the timer exceeding the threshold, the kernel 101 may interrupt the function foo8( ) and/or goo3( ). The kernel 101 may determine which function to interrupt based on the relative priorities of each function and/or the amount of time each function has been running. In response to the interrupt, the kernel 101 may preserve the contents of the queue 105 as part of a FFDC.

Figure 3:
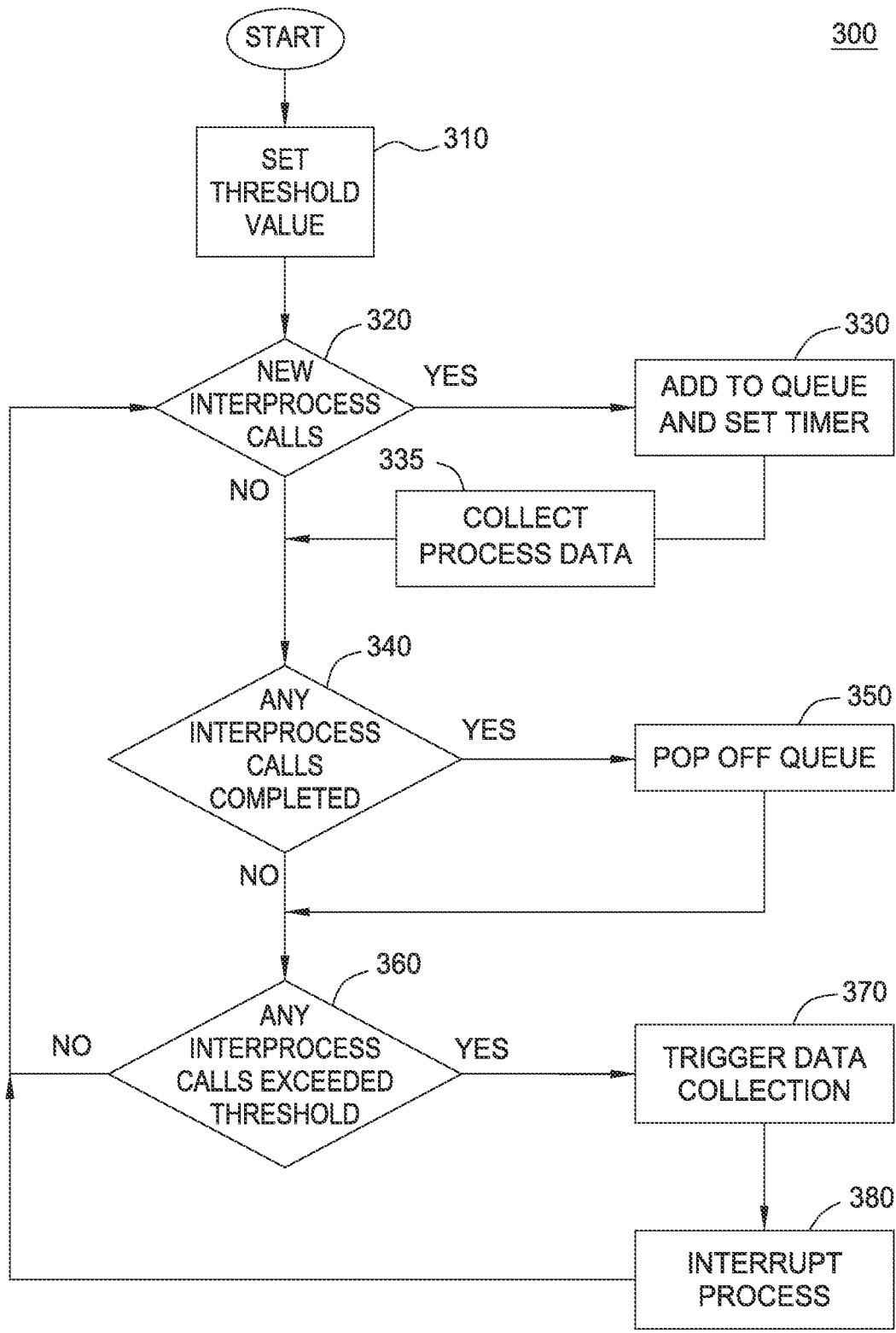
FIG. 3 illustrates a method to dynamically detect and interrupt excessive execution times, according to one embodiment.

FIG. 3 illustrates a method 300 to dynamically detect and interrupt excessive execution times, according to one embodiment. Generally, the steps of the method 300 detect excessive execution times by processes/functions by setting a timer for inter-process calls. When a time threshold is reached, dump data is preserved, allowing faults to be more easily isolated, which allows fewer resources to be used (e.g., entire system data dumps are not required).

As shown, the method 300 begins at step 310, where threshold values for one or more processes are defined. For example, a threshold for a first process may be 50 milliseconds, while a threshold for a second process may be 5 minutes, and a threshold for a third process may be one hour. The thresholds may be user-defined or programmatically determined, as described in greater detail with reference to FIG. 4. At step 320, the kernel 101 may monitor processes executing on a system to detect inter-process calls. If an inter-process call is detected, the method proceeds to step 330, where the kernel 101 adds an indication of the inter-process call to the queue 105 and sets a timer for the inter-process call. If no inter-process calls are detected, the method proceeds to step 340. At step 335, the kernel 101 may collect process data. The process data may include, for each process in the inter-process call, contents of a stack for each process in memory, process memory usage, and the like. At step 340, the kernel 101 determines whether any inter-process calls have completed. If an inter-process call has completed, the method proceeds to step 350, where the kernel 101 pops (or removes) the entry for the inter-process call from the queue 105. If no inter-process calls are made, the method proceeds to step 360. At step 360, the kernel 101 determines whether any inter-process calls have been executing for a time which exceeds the respective time threshold for the process/function call. If no inter-process calls have an execution time which exceeds the respective time threshold, the method returns to step 320. If the execution time of an inter-process call has exceeded the relevant threshold, the method proceeds to step 370, where the kernel 101 triggers data collection. Generally, the data collection includes storing the contents of the queue 105, the process data, and other relevant items for future use. In at least one embodiment, the data collection includes taking a FFDC. At step 380, the kernel 101 may interrupt the offending process. The interrupt may terminate and/or restart one or more processes.

Figure 4:
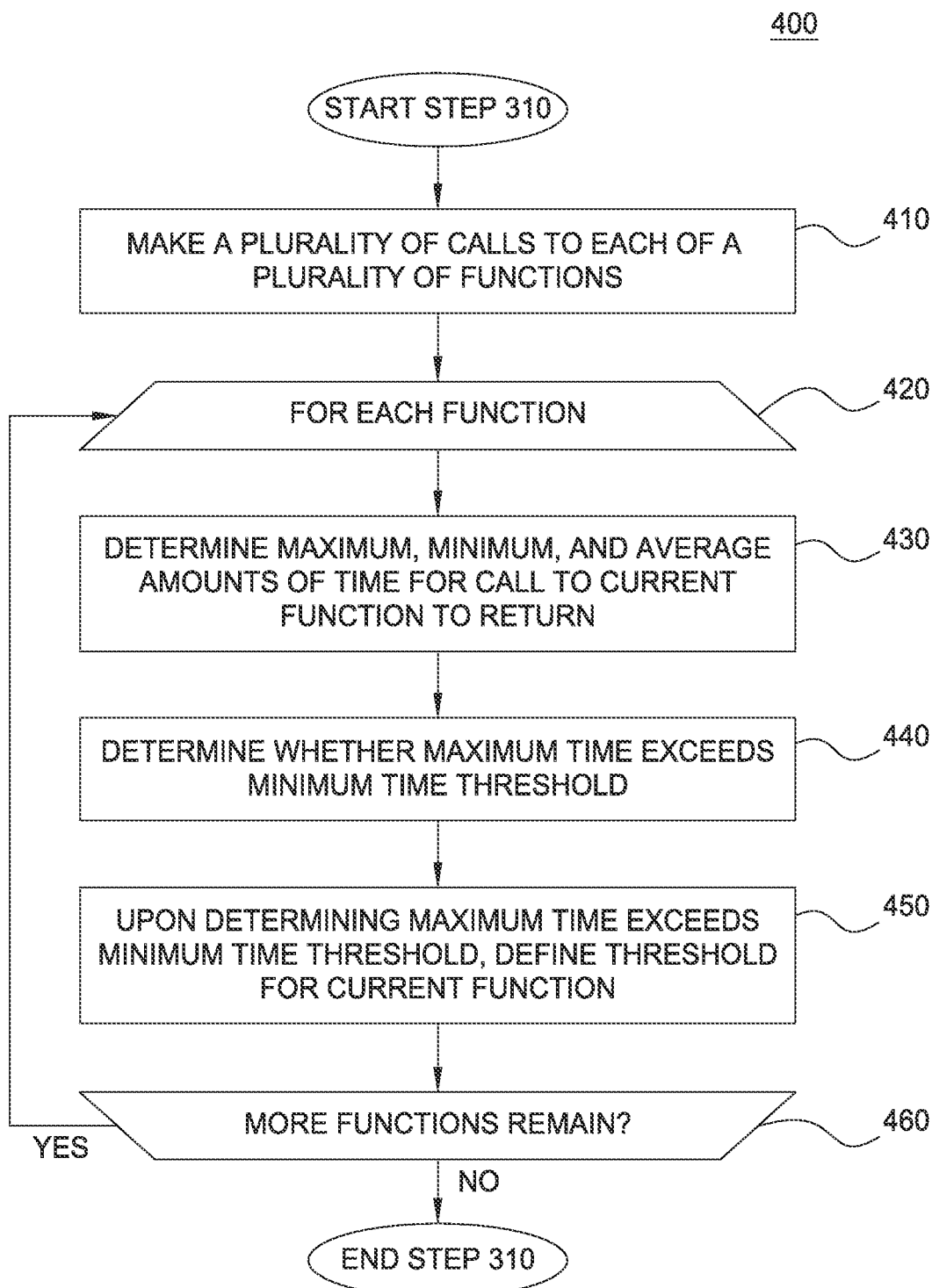
FIG. 4 illustrates a method to define time thresholds, according to one embodiment.

FIG. 4 illustrates a method 400 corresponding to step 310 to define time thresholds, according to one embodiment. Generally, a test environment may be configured to learn and define the time thresholds according to the steps of the method 400. As shown, the method 400 begins at step 410, where a plurality of calls are made to each of a plurality of functions. The plurality of functions may be those functions for which debugging is desired, such as those functions which experience hangs or deadlocks in a system. At step 420, a loop including steps 430-450 is executed for each function for which a plurality of calls were executed at step 410. At step 430, the maximum, minimum, and average amounts of time required to make the current function call are determined. For example, the quickest execution time (and therefore minimum time) of function A may be observed as 1 second, the slowest execution time (and therefore maximum time) of function A may be 10 seconds, and the average execution time (for all calls) of function A may be 8 seconds.

At step 440, a determination is made as to whether the maximum time for the current function exceeds a minimum time threshold. For example, if the minimum time threshold is 30 seconds, then function A's maximum execution time of 10 seconds would not exceed the minimum time threshold. Therefore, a threshold may not be defined for function A, as it may reasonably be expected that function A will not hang or experience a deadlock. At step 450, upon determining the maximum time for the current function exceeds the minimum time threshold, a time threshold is defined for the current function. For example, if the minimum time threshold is 100 microseconds, then function A's maximum time of 10 seconds (and minimum time of 1 second) indicates that a threshold should be defined for function A. The time threshold may be the minimum time, the maximum time, the average time, or any other amount of time, such as a system default time. At step 460, if more functions remain, the method returns to step 420. Otherwise, if no more functions remain, the method 400 ends.

Figure 5:
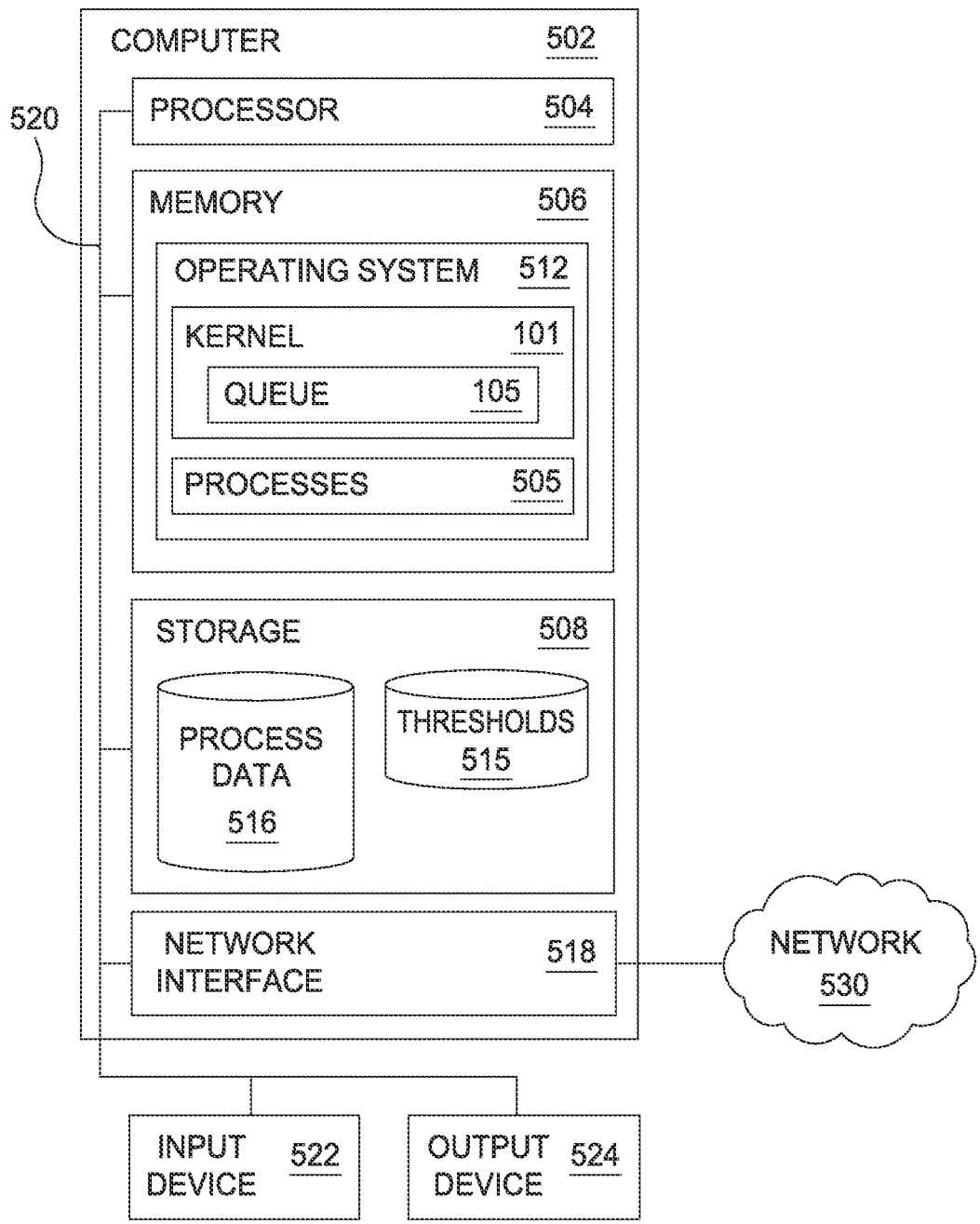
FIG. 5 illustrates a system configured to dynamically detect and interrupt excessive execution times, according to one embodiment.

FIG. 5 illustrates a system configured to dynamically detect and interrupt excessive execution times, according to one embodiment. The networked system 500 includes a computer 502. The computer 502 may also be connected to other computers via a network 530. In general, the network 530 may be a telecommunications network and/or a wide area network (WAN). In a particular embodiment, the network 530 is the Internet.

The computer 502 generally includes a processor 504 which obtains instructions and data via a bus 520 from a memory 506 and/or a storage 508. The computer 502 may also include one or more network interface devices 518, input devices 522, and output devices 524 connected to the bus 520. The computer 502 is generally under the control of an operating system 512. Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 504 is a programmable logic device that performs instruction, logic, and mathematical processing, and may be representative of one or more CPUs. The network interface device 518 may be any type of network communications device allowing the computer 502 to communicate with other computers via the network 530.

The storage 508 is representative of hard-disk drives, solid state drives, flash memory devices, optical media and the like. Generally, the storage 508 stores application programs and data for use by the computer 502. In addition, the memory 506 and the storage 508 may be considered to include memory physically located elsewhere; for example, on another computer coupled to the computer 502 via the bus 520.

The input device 522 may be any device for providing input to the computer 502. For example, a keyboard and/or a mouse may be used. The input device 522 represents a wide variety of input devices, including keyboards, mice, controllers, and so on. Furthermore, the input device 522 may include a set of buttons, switches or other physical device mechanisms for controlling the computer 502. The output device 524 may include output devices such as monitors, touch screen displays, and so on.

As shown, the memory 506 contains the operating system 512, the kernel 101, the queue 105, and a set of processes 505. As previously indicated, the kernel 101 is configured to detect excessive execution time by one or more processes 505 executing on the system 502. When a process 505 makes an inter-process call to a different process 505, the kernel 101 may invoke the timing logic 110 to start a timer for the inter-process call. The kernel 101 may add an indication of the inter-process call to the queue 105. If the inter-process call completes before expiration of the time threshold, the kernel 101 removes the indication of the inter-process call from the queue 105. If, however, the timer for the inter-process call exceeds a relevant time thresholds in the thresholds 515, the kernel 101 may trigger a data dump and interrupt one or more of the processes 505.

As shown, the storage 508 contains the thresholds 515 and the process data 516. The thresholds 515 include a plurality of time thresholds within which one or more processes 515 must complete execution. The thresholds 515 may be defined by a user or programmatically defined. In one embodiment, the thresholds 515 are programmatically defined according to the steps of method 400. The process data 516 includes process data related to each of the processes 505. For example, the process data 516 may include execution times that can be used to define thresholds for each process. The process data 516 may also include attributes of each process, such as whether to exempt the process from a time threshold (and therefore exclude monitoring of the process when it makes an inter-process call, or is the subject of an inter-process call). The process data 516 may further include priorities for each process, which may include data which describes the consequences of terminating the process (which the kernel 101 may use to determine which process to terminate or restart). As previously indicated, the process data 516 may include the process data collected at the time of each inter-process call, which includes, without limitation, contents of the process' stack, process memory usage, and the like.

Advantageously, embodiments disclosed herein provide techniques to limit excessive execution times by processes (or functions) in a computing system. By setting a timer, in the kernel, embodiments disclosed herein programmatically determine when an inter-process call exceeds a time threshold. When the threshold is exceeded, embodiments disclosed herein interrupt one or more processes and collect data to facilitate debugging and error identification.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
   executing, by a first function of a first process executing on a processor, a plurality of calls to a second function of a second process;
   programmatically generating, based on a respective amount of time required for each of the plurality of calls to complete, a time threshold for calls from the first function to the second function; and
   subsequent to the plurality of calls completing:
      storing, by an operating system (OS) kernel executing on the processor and in a queue of the OS kernel, an indication that the first function of the first process executing on the processor has made an additional call to the second function of the second process;
      collecting process data for at least one of the first process and the second process;
      determining, by the OS kernel, that an amount of time that has elapsed since the first function of the first process made the additional call to the second function of the second process exceeds the programmatically defined time threshold;
      storing the queue and the process data as part of a failure data capture; and
      performing a predefined operation on at least one of the first process and the second process.

2. The method of claim 1, wherein the process data comprises: (i) contents of a respective stack of each process, (ii) a respective use of the processor by each process, (iii) a respective use of a memory of each process, and (iv) a total amount of use of the processor.

3. The method of claim 2,
   wherein the time threshold is programmatically generated based on: (i) an average amount of time required for the plurality of calls to complete, (ii) a minimum amount of time required for one of the plurality of calls to complete, and (iii) a maximum amount of time required for one of the plurality of calls to complete, and wherein the time threshold is defined upon determining that the maximum amount of time required for one of the plurality of calls to complete is greater than a minimum time threshold for performing the predefined operation.

4. The method of claim 3, further comprising:
   upon determining that the first function in the first process calls the second function in the second process, starting, by the OS kernel, a timer used to determine that the time threshold has been exceeded by the elapsed time.

5. The method of claim 4, further comprising, prior to determining that the amount of time exceeds the time threshold:
   determining, by the OS kernel, that the second function in the second process calls a third function in a third process; and
   storing, in the queue, an indication that the second function called the third function.

6. The method of claim 5, further comprising:
   upon determining the call to the third function in the third process completes, removing, from the queue, the indication that the second function in the second process called the third function in the third process.

7. The method of claim 5, wherein the first process accesses a first address space in a memory, wherein the second process addresses a second address space in the memory, different than the first address space in the memory, wherein the queue is stored in a protected area of the memory accessible by the OS kernel, wherein a content of the memory is stored as part of the failure data capture, wherein the predefined operation comprises one of: (i) terminating, (ii) interrupting, and (iii) restarting at least one of the first process and the second process, wherein the at least one of the first process and the second process is selected based on: (i) an execution time of the first process and the second process, (ii) a priority of the first process, and (iii) a priority of the second process.

8. A system, comprising:
   a computer processor; and
   a memory containing a program which when executed by the processor performs an operation comprising:
      executing, by a first function of a first process executing on the processor, a plurality of calls to a second function of a second process;
      programmatically generating, based on a respective amount of time required for each of the plurality of calls to complete, a time threshold for calls from the first function to the second function; and subsequent to the plurality of calls completing:

storing, by an operating system (OS) kernel executing on the processor and in a queue of the OS kernel, an indication that the first function of the first process executing on the processor has made an additional call to the second function of the second process;

collecting process data for at least one of the first process and the second process;

determining, by the OS kernel, that an amount of time that has elapsed since the first function of the first process made the additional call to the second function of the second process exceeds the programmatically defined time threshold;

storing the queue and the process data as part of a failure data capture; and performing a predefined operation on at least one of the first process and the second process.

9. The system of claim 8, wherein the process data comprises: (i) contents of a respective stack of each process, (ii) a respective use of the processor by each process, (iii) a respective use of a memory of each process, and (iv) a total amount of use of the processor.

10. The system of claim 9,
wherein the time threshold is programmatically generated based on: (i) an average amount of time required for the plurality of calls to complete, (ii) a minimum amount of time required for one of the plurality of calls to complete, and (iii) a maximum amount of time required for one of the plurality of calls to complete, and wherein the time threshold is defined upon determining that the maximum amount of time required for one of the plurality of calls to complete is greater than a minimum time threshold for performing the predefined operation.

11. The system of claim 10, the operation further comprising:
upon determining that the first function in the first process calls the second function in the second process, starting, by the OS kernel, a timer used to determine that the time threshold has been exceeded by the elapsed time.

12. The system of claim 11, the operation further comprising, prior to determining that the amount of time exceeds the time threshold:
determining, by the OS kernel, that the second function in the second process calls a third function in a third process; and
storing, in the queue, an indication that the second function called the third function.

13. The system of claim 12, the operation further comprising:
upon determining the call to the third function in the third process completes, removing, from the queue, the indication that the second function in the second process called the third function in the third process.

14. The system of claim 13, wherein the first process accesses a first address space in a memory, wherein the second process addresses a second address space in the memory, different than the first address space in the memory, wherein the queue is stored in a protected area of the memory accessible by the OS kernel, wherein a content of the memory is stored as part of the failure data capture, wherein the predefined operation comprises one of: (i) terminating, (ii) interrupting, and (iii) restarting at least one of the first process and the second process, wherein the at least one of the first process and the second process is selected based on: (i) an execution time of the first process and the second process, (ii) a priority of the first process, and (iii) a priority of the second process.

15. A computer program product comprising:
a non-transitory computer-readable storage medium having computer-readable program code embodied therewith, the computer-readable program code executable by one or more computer processors including a first processor to perform an operation comprising:
executing, by a first function of a first process executing on the processor, a plurality of calls to a second function of a second process;
programmatically generating, based on a respective amount of time required for each of the plurality of calls to complete, a time threshold for calls from the first function to the second function; and
subsequent to the plurality of calls completing:
storing, by an operating system (OS) kernel executing on the processor and in a queue of the OS kernel, an indication that the first function of the first process executing on the processor has made an additional call to the second function of the second process;
collecting process data for at least one of the first process and the second process;
determining, by the OS kernel, that an amount of time that has elapsed since the first function of the first process made the additional call to the second function of the second process exceeds the programmatically defined time threshold;
storing the queue and the process data as part of a failure data capture; and
performing a predefined operation on at least one of the first process and the second process.

16. The computer program product of claim 15, wherein the process data comprises: (i) contents of a respective stack of each process, (ii) a respective use of the processor by each process, (iii) a respective use of a memory of each process, and (iv) a total amount of use of the processor.

17. The computer program product of claim 16,
wherein the time threshold is programmatically generated based on: (i) an average amount of time required for the plurality of calls to complete, (ii) a minimum amount of time required for one of the plurality of calls to complete, and (iii) a maximum amount of time required for one of the plurality of calls to complete, and wherein the time threshold is defined upon determining that the maximum amount of time required for one of the plurality of calls to complete is greater than a minimum time threshold for performing the predefined operation.

18. The computer program product of claim 17, the operation further comprising:
upon determining that the first function in the first process calls the second function in the second process, starting, by the OS kernel, a timer used to determine that the time threshold has been exceeded by the elapsed time.

19. The computer program product of claim 18, the operation further comprising, prior to determining that the amount of time exceeds the time threshold:
determining, by the OS kernel, that the second function in the second process calls a third function in a third process; and
storing, in the queue, an indication that the second function called the third function.

20. The computer program product of claim 19, wherein the first process accesses a first address space in a memory, wherein the second process addresses a second address space in the memory, different than the first address space in the memory, wherein the queue is stored in a protected area of the memory accessible by the OS kernel, wherein a content of the memory is stored as part of the failure data capture, wherein the predefined operation comprises one of: (i) terminating, (ii) interrupting, and (iii) restarting at least one of the first process and the second process, wherein the at least one of the first process and the second process is selected based on: (i) an execution time of the first process and the second process, (ii) a priority of the first process, and (iii) a priority of the second process, the operation further comprising:

upon determining the call to the third function in the third process completes, removing, from the queue, the indication that the second function in the second process called the third function in the third process.

\* \* \* \* \*